United States Patent

Tansei et al.

[11] Patent Number: 5,141,039
[45] Date of Patent: Aug. 25, 1992

[54] CORE ASSEMBLY FOR PNEUMATIC TIRE AND PNEUMATIC TIRE ASSEMBLY

[75] Inventors: Hikaru Tansei; Mitsunori Wada; Yoichi Honbo, all of Kodaira, Japan

[73] Assignee: Bridgestone Corporation, Tokyo, Japan

[21] Appl. No.: 490,402

[22] Filed: Mar. 8, 1990

[30] Foreign Application Priority Data

Mar. 17, 1989 [JP] Japan ................ 1-65270

[51] Int. Cl.⁵ .................................. B60C 17/06
[52] U.S. Cl. ................................ 152/158; 152/520
[58] Field of Search ...................... 152/158, 520

[56] References Cited

U.S. PATENT DOCUMENTS

| | | | |
|---|---|---|---|
| Re. 28,196 | 10/1974 | Patecell | 152/158 |
| 3,976,114 | 8/1976 | Patecell | 152/158 |
| 4,085,786 | 4/1978 | Caravito | 152/158 |
| 4,418,734 | 12/1983 | Dobson | 152/520 |
| 4,424,842 | 1/1984 | Trebaol | 152/520 |
| 4,641,670 | 2/1987 | Poque et al. | 152/520 |
| 4,681,147 | 7/1987 | Hugele | 152/520 |

FOREIGN PATENT DOCUMENTS

| | | | |
|---|---|---|---|
| 194767 | 9/1986 | European Pat. Off. | 152/520 |
| 55-3163 | 1/1980 | Japan | |

Primary Examiner—Michael W. Ball
Assistant Examiner—Nancy T. Krawczyk
Attorney, Agent, or Firm—Oliff & Berridge

[57] ABSTRACT

At lest a portion of a core assembly for a pneumatic tire, which is mounted on an outer surface of a well portion of an annular rim to which the pneumatic tire is attached, is formed from an elastomer material. The radial height of the core assembly in a condition where an inner surface of a crown portion of the tire is in contact with an outer peripheral surface of the core assembly is set in a range of from 40% to 70% of the normal height of the tire, and the width of the outer peripheral surface of the core assembly is set at 0.5 or more times the radial height of the core assembly.

7 Claims, 2 Drawing Sheets

CORE ASSEMBLY FOR PNEUMATIC TIRE AND PNEUMATIC TIRE ASSEMBLY

BACKGROUND OF THE INVENTION

1. Field of the Invention

The present invention relates to a core assembly for a pneumatic tire, which is fitted on an outer surface of a well portion of a rim and allows a safe running over a given distance when the internal pressure in the pneumatic tire has been reduced, as well as a pneumatic tire assembly.

2. Description of the Related Art

There is a conventionally known core assembly for a pneumatic tire, for example, as described in Japanese Patent Publication No. 3163/80. This core assembly is assembled in an annular fashion from two or more arcuate elements placed one on another and connected to one another and is fitted on an outer surface of the well portion of the rim to which a pneumatic tire is attached. The entire core assembly is formed from a hard plastic material and has a radial height set in a range of 30% to 60% of the height of the tire. This core assembly for the pneumatic tire is designed such that it may be slid on the well portion and rotated by a force applied thereto from the pneumatic tire, and prevented from slipping relative to the crown portion of the pneumatic tire when the pneumatic tire has collapsed due to a reduction in internal pressure, resulting in an inner surface of a crown portion of the pneumatic tire being placed into contact with a radially outer surface of the core assembly.

However, this core assembly has a problem. Since only the core assembly supports the collapsing of the pneumatic tire from the inside upon a reduction in internal pressure, the pressure of ground contact of the pneumatic tire on a road surface tends to be increased due to concentration on a point which is in contact with the radially outer surface of the core assembly. The above related art core assembly has a small width at its radially outer surface and hence, the ground contact pressure at a point which is in contact with the core assembly is considerably increased and consequently, if the tire runs at a high speed under a high load after reduction of the internal pressure, the point which is in contact with the core assembly abnormally develops heat and ultimately, is damaged or broken.

SUMMARY OF THE INVENTION

It is an object of the present invention to provide a core assembly for a pneumatic tire and a pneumatic tire assembly which is capable of running at a higher speed under a higher load over a relatively long distance even after reduction in the internal pressure.

The above object is achieved by providing a core assembly for a pneumatic tire, which comprises two or more arcuate elements connected to one another with their ends placed one on another and which is fitted in an annular fashion on an outer surface of a well portion of a rim to which a pneumatic tire is attached, so that it may be slid on the well portion and rotated when the pneumatic tire has collapsed due to a reduction in internal pressure, resulting in an inner surface of a crown portion of the pneumatic tire being placed into contact with the radially outer peripheral surface of the core assembly. The core assembly has at least a portion formed from an elastomer material, and a radial height during such contact set in a range of 40% to 70% of the height of the pneumatic tire, and a width of the outer peripheral surface set at a value of 0.5 or more times the radial height.

In addition, according to the present invention, there is provided a pneumatic tire assembly which comprises:

an annular rim;

a pneumatic tire body mounted on the rim; and a core assembly which comprises two or more arcuate elements connected to one another with their ends placed one on another and which is fitted in an annular fashion on an outer surface of a well portion of the rim, so that it may be slid on the well portion and rotated when the pneumatic tire body has collapsed due to a reduction in internal pressure, resulting in an inner surface of a crown portion of the pneumatic tire body being placed into contact with a radially outer peripheral surface of the core assembly. The core assembly has at least a portion formed from an elastomer material, and a radial height during such contact set in a range of 40% to 70% of the height of the pneumatic tire, and the width of the outer peripheral surface set at a value 0.5 or more times the radial height.

Now, suppose that the pneumatic tire filled to a predetermined internal pressure is running. During this time, the core assembly is being rotated in unison with the rim by the contact friction between its radially inner surface and the well portion of the rim. Then, if the internal pressure in the pneumatic tire is reduced due to a puncture or another reason, the pneumatic tire is collapsed at its ground contact side resulting in the inner surface of the crown portion being placed into contact with the radially outer surface of the core assembly. At this time, the core assembly supports the pneumatic tire from the inside to inhibit such collapsing. This enables the running (flat running) of the pneumatic tire under a reduced internal pressure condition and permits the core assembly to be slid on the well portion and rotated by a forced applied thereto from the pneumatic tire, thereby-preventing the slipping between the core assembly and the crown portion of the pneumatic tire. In addition, at this time, the ground contact pressure of the pneumatic tire on a road surface tends to be increased due to concentration at a point which is in contact with the radially outer surface of the core assembly. However, the core assembly according to the present invention has a width at its radially outer surface as large as 0.5 or more times the radial height thereof. Consequently, even if the pneumatic tire runs at a high speed under a high load after reduction of the internal pressure, the ground contact pressure at the point which is in contact with the core assembly is less increased, thereby ensuring that the pneumatic tire can run over a relatively long distance with a reduction in developed heat without any damage.

According to the present invention, it is preferable that the width of the core assembly at its radially outer surface is 0.7 or more times the radial height thereof. If so, the ground contact pressure upon a reduction in internal pressure of the pneumatic tire can be further reduced, thereby extending the runable distance.

Further, according to the present invention, the core assembly may be formed from a material having a compressive modulus of 40 kg/cm$^2$ at a strain of 3%. This makes it possible to reduce the longitudinal flexure of the core assembly at a reduced internal pressure.

According to the present invention, each arcuate element may be comprised of a thick portion centrally provided therein and thinner portions provided at its opposite ends, and a reinforcing fitment may be mounted on each arcuate element to extend over the thick portion and the thinner portion. With such a construction, the thinner opposite ends or connections of the arcuate element having the least strength are reinforced, and it is possible to prevent damaging or breaking of the core assembly itself during running at a reduced internal pressure.

Further, according to the present invention, at least one recess may be provided at the radially outer surface of the core assembly. Such formation ensures that when the internal pressure in the pneumatic tire has been reduced, a vibration can be generated to early notify the driver or operator of the reduction in internal pressure.

In addition, the present invention contemplates a pneumatic tire assembly including the core assembly constructed in the above manner.

The above and other objects, features and advantages of the invention will become apparent from a reading of the following detailed description of the preferred embodiment, taken in conjunction with the accompanying drawings.

DESCRIPTION OF THE PREFERRED EMBODIMENT

The present invention will now be described by way of one embodiment with reference to the accompanying drawings.

Figure 1:
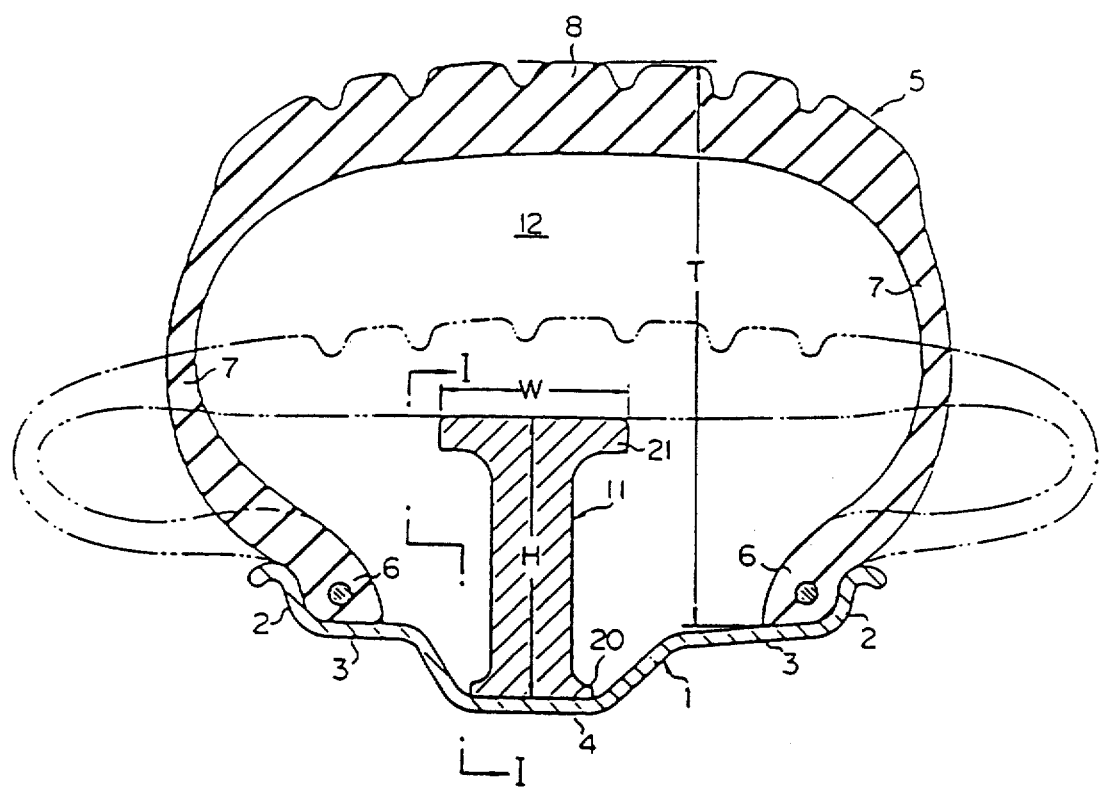
FIG. 1 is a radial cross sectional view of a pneumatic tire and a core assembly according to an embodiment of the present invention.
Figure 2:
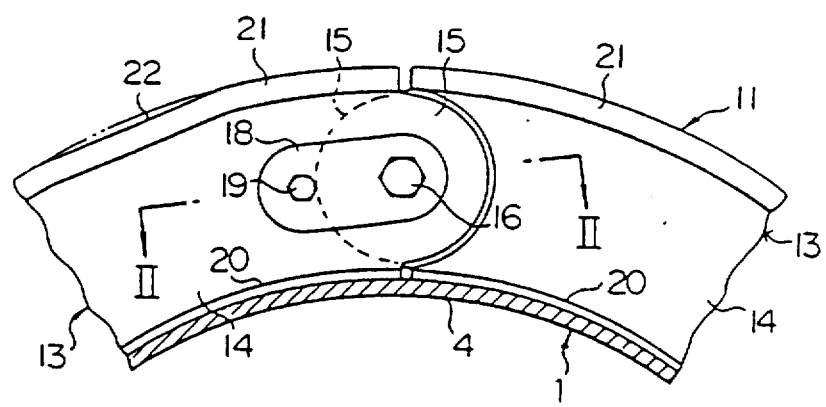
FIG. 2 is a sectional view taken along line I—I in FIG. 1.
Figure 3:
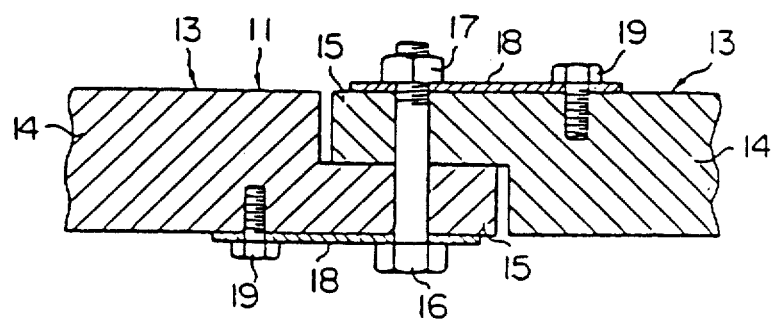
FIG. 3 is a sectional view taken along line II—II in FIG. 2.

Referring to FIGS. 1, 2 and 3, an annular rim 1 has flange portions 2 at its axially opposite sides. Between the flange portions 2, the rim 1 is provided with bead seats 3 and a radially inwardly recessed well portion 4.

A pneumatic tire 5 mounted on the rim 1 includes a pair of beads 6 seated on the bead seats 3, sidewalls 7 extending substantially radially outwardly from the beads 6, and a crown portion 8 extending between the sidewalls 7. A core assembly 11 is mounted in an internal chamber 12 surrounded by the rim 1 and the tire 5 and is fitted on an outer surface of the well portion 4. The core assembly 11 is comprised of two or more arcuate elements 13 having the same shape. Each of the arcuate elements 13 consists of an elongated thick central portion 14 having thinner portions 15 provided at opposite ends thereof, the thinner portions being approximately one half the thickness of the thick portion 14. Thus, the arcuate elements 13 are connected to one another with their thinner portions 15 overlapped one on another, by a bolt 16 passed through the overlapped thinner portions 15, and by a nut 17 screwed onto the bolt 16, thus forming an annular core assembly 11. Since the thinner portions 15 are provided at the opposite ends of each arcuate element 13 as described above, the opposite end portions of each arcuate element 13 are reduced in strength against a lateral force and are liable to be damaged or broken. In the present embodiment, however, a plate-like reinforcing fitment 18 is attached to a surface of each arcuate element 13 to extend over the thinner portion 15 and the thick portion 14 in order to reinforce the thinner portions 15. The attachment of the reinforcing fitment 18 to the arcuate element 13 is achieved by tightening one end of the reinforcing fitment 18 against the thinner portion 15 by the bolt 16 and the nut 17 and by tightening the other end against the thick portion 14 by another bolt 19. However, if two or more bolts 19 are used, the ability of the reinforcing fitment 18 to follow a compression deformation of the core assembly 11 upon a reduction in internal pressure in the tire is lost, so that a stress may be concentrated on the bolts 19 and thus, the bolts 19 are apt to be broken. For this reason, it is preferred to use a single bolt 19. Alternatively, other means such as a set screw and the like may be used in place of the bolt 19. Alternatively, the reinforcing fitment 18 may be adhesively attached to the arcuate element 13. In addition, the entire core assembly 11 may be formed from a plastic material or a elastomer material such as a hard rubber, or may be formed from a combination of such an elastomer material with a glass or carbon fiber or the like, but it is preferred that at least a portion of the core assembly 11 is formed from an elastomer material. Since at least a portion of the core assembly 11 is formed from an elastomer material as described above, the core assembly 11, if an external force acts radially inwardly thereon, may be compressed at its side subjected to the action of the external force, and as a result, a gap may be produced between the core assembly 11 and the well portion 4 on the opposite side spaced through 180° from the side subjected to the action. Thus, it is preferable that a material having a compressive modulus of 40 kg/cm² at a strain of 3% is used for forming the core assembly 11. This is because the use of a material having a compressive modulus less than 40 kg/cm² will result in a much large radial flexure of the core assembly when the internal pressure is reduced and a load is applied to the core assembly. Herein, the compressive modulus is represented by a value measured in a compression test for a test piece having a diameter of 30 mm and a height of 30 mm. It is also preferable that the radial height H of the core assembly 11 (which is a radial height of the core assembly 11 in a condition where the crown portion 8 is in contact with the core assembly 11 at a reduced internal pressure in the tire 5 with a load applied to the core assembly 11, and which is slightly smaller than the radial height with no load because at least a portion of the core assembly 11 is formed from an elastomer material as described above) is in a range of 40% to 70% of the height T of the tire. This is because if the radial height is less than 40%, the sidewalls 7 are contacted on a road surface upon a reduction in internal pressure and are in danger of damage or breaking during running, whereas if the radial height exceeds 70%, the crown portion 8 is placed into contact with the core assembly by a dynamic load during a normal running at an unreduced internal pressure or the property of assembling on the rim is degraded. The core assembly 11 has an I-shaped section taken along radial plane and includes wider portions 20 and 21 formed at its radially inner and outer sides, respectively. If the wider portion 20 is formed at the radially inner side of the core assembly 11, the area of the core assembly 11 contacting with the well portion 4 is widened, leading to an increased frictional resistance, which insures the rotation of the core assembly 11 in unison with the rim 1 during a normal running at an unreduced internal pressure. On the other hand, it is preferably that the width W of the wider portion 21, i.e., the axial width of the radially outer side of the core assembly 11 is 0.5 or more times, more preferably 0.7 or more times the radial height H. The reason is that if the width W is less than 0.5 times the radial height H when the crown portion 8 of the tire 5 is placed in contact with the core assembly 11, the ground contact pressure at a point of the crown portion 8 in contact with the core assembly 11 is considerably increased, resulting in the possibility that the tire 5 is damaged or broken. At least one recess 22 may be formed at the radially outer side of the core assembly 11, and in this embodiment, a flat portion is formed. Once recess may be formed in every arcuate element 13, so that two or more recesses may be formed in the core assembly 11. If the recess 22 is formed in the core assembly 11 in this manner, a vibration is produced whenever the recess 22 reaches the ground contact side when the internal pressure is reduced. This makes it possible to early notify the driver or operator of the fact that the internal pressure in the tire 5 has been reduced.

Description will now be made of the operation of the embodiment of the present invention.

To attach the core assembly 11 to the rim 1 while assembling it thereon, one of the beads 6 of the tire 5 is first fitted on the outer side of the rim 1 and then, the annular core assembly 11 is fitted on the outer surface of the well portion 4. At this time, most of the thinner portions 15 of the arcuate elements 13 constituting the core assembly 11 are placed one on another and connected to one another by the bolt 16, but at only one point the arcuate elements 13 are not connected. Then, the thinner portions 15 of the arcuate elements 13 which are still not connected are placed one on another and then connected by the bolt 16, thus assembling the core assembly 11 in an annular form. Then, the other bead portion 6 of the tire 5 is fitted on the outer side of the rim 1 and a predetermined internal pressure is then filled into the internal chamber 12. Thereafter, the resulting rim 1 and tire 5 are mounted on a vehicle which is then allowed to run. During this running, a major area of the wider portion 20, i.e., the radially inner side of the core assembly 11 is in contact with the well portion 4 and therefore, the core assembly 11 is rotated in unison with the rim due to the frictional resistance with the well portion 4. Even if a dynamic load is applied to the tire 5 due to an unevenness of a road surface, the crown portion 8 of the tire 5 cannot be placed into contact with the radially outer surface of the core assembly 11, and the property of assembling on the rim cannot be deteriorated, because the radial height H of the core assembly 11 is 70% or less than the height T of the tire.

If the internal pressure in the tire 5 is reduced due to a puncture or another reason, the ground contact side of the tire 5 is subjected to a load and largely collapses as shown by a phantom line in FIG. 1 and thus, the inner surface of the crown portion 8 is placed into contact with the radially outer surface of the core assembly 11. At this time; the core assembly 11 supports the load acting on the tire 5 from the inside. This prevents the tire 5 from being collapsed to the extent that the sidewalls 7 are placed into contact with the road surface because the radial height H of the core assembly 11 is 40% or more of the height t of the tire, thereby enabling the running (flat running) of the tire 5 at a reduced internal pressure. At this time, since the tire 5 is rotated with the inner surface of the crown 8 being in contact with the radially outer surface of the core assembly 11, the crown portion 8 and the core assembly 11 will tend to slip relative to each other. Since at least a portion of the core assembly 11 is formed from an elastomer material, however, the core assembly 11 is subjected to the load and compressed, resulting in a gap being produced between the radially inner surface of the core assembly 11 on the opposite side spaced apart through approximately 180° from the ground contact side and the well portion 4. If the gap is produced between the core assembly 11 and the well portion 4 in this manner, the core assembly 11 is subjected to a circumferential force from the crown portion 8 making it slide on the well portion 4 and rotate so that no slipping relative to the crown portion 8 is produced. This prevents the situation that the crown portion 8 of the tire 5 is exothermically deteriorated and broken due to the slipping contact with the core assembly 11. At this time, only the core assembly 11 supports the tire 5 from the inside, so that the pressure of ground contact of the tire 5 on the road surface tends to be increased by the concentration on only a point which is in contact with the radially outer surface of the core assembly 11. Because the width W of the radially outer end of the core assembly 11 is as large as 0.5 or more times the radial height H of the core assembly 11, however, the ground contact pressure is less increased. As a result, the tire is permitted to run over a relatively long distance at a higher speed under a higher load even after reduction of the internal pressure. At this time, there is a tendency that if a lateral force is applied to the tire 5 by a steering operation, this force is transmitted to the core assembly 11 to produce twisting deformation to the core assembly 11. Since the core assembly 11 is constructed of the arcuate elements 13 whose thinner portions 15 are placed one on another and connected to one another, such connections are weakest and liable to be damaged or broken. In this embodiment, however, the reinforcing fitment 18 is attached to the connection of each arcuate element 13 to prevent the damaging or breaking of the core assembly 11. In addition, if the internal pressure in the tire 5 is reduced to permit the crown portion 8 to be placed into contact with the core assembly 11, a vibration can be generated whenever the recess 22 in the core assembly 11 reaches the ground contact side, thereby early notifying the driver or operator of the reduction in internal pressure of the tire 5.

An experimental example will be described below. In this experiment, there were prepared assemblies comprising a pneumatic tire and a rim, and having specifications as given in Table, i.e., Comparative example 1 and Examples 1, 2, 3, 4 and 5. The size of each tire was of 195/70HR14, and the size of the rim was of 5.5H14. The internal pressure of each assembly was reduced to zero and allowed to run on a normal road at a speed of 60km/hr., while being subjected to a load 0.8 times the normal load to measure the distance until the internal pressure of zero was detected and the distance until trouble occurred in the tire. Results are given in the following table. As apparent from the table, the distances until trouble, i.e., the flat running distances in Examples 1, 2, 3, 4 and 5 of the present invention are remarkably increased as compared with Comparative example 1.

While the reinforcing fitment 18 has been attached to the surface of each arcuate element 13 in the above embodiment, it will be understood that the reinforcing fitment 18 may be embedded into the arcuate element 13.

TABLE

|  | C.E. No. 1 | Example NO. 1 | 2 | 3 | 4 | 5 |
|---|---|---|---|---|---|---|
| H/T (%) | 30 | 50 | 50 | 50 | 60 | 80 |
| W/T (%) | 0.4 | 0.7 | 0.7 | 0.7 | 0.7 | 0.7 |
| C.M. | 30 | 50 | 80 | 80 | 80 | 80 |
| P or A of B | A | A | A | P | P | P |
| Number of Vs | 0 | 0 | 0 | 2 | 1 | 1 |
| P or A of R | A | A | A | A | A | P |
| R of TS | P | A | A | A | A | A |
| S in GO | S | S | S | S | S | L |
| Distance* | 15 | 60 | 80 | 90 | 115 | 115 |
| Tro. Si. | (a)*1 | (b)*2 | (b)*2 | (b)*2 | (b)*2 | (b)*2 |
| WE in A | good | good | good | good | good | bad |

C.E. = Comparative example
C.M. = Compressive modulus (kg/cm$^2$) at a strain of 3%
P or A of B = Present or Absence of reinforcing fitment
Number of Vs = Number of bolts (19)
P or A of R = Presence or absence of recess (22)
R of TS = Rubbing of a tire side at zero internal pressure
S in GO = Shock in getting over obstacle at normal internal pressure
Distance* = Flat running distance (km)
Tro. Si. = Trouble situation
(a)*1: Side was rubbed
(b)*2: Core was ruptured
WE in A = Working efficiency in assembling tire to rim

What is claimed is:

1. A core assembly for use with a pneumatic tire mounted on a rim, comprising:

at least two arcuate elements made of plastic material and connected to one another with an end of each said arcuate element connected to an end of an adjacent said arcuate element, each said arcuate element including an elongated thick central portion and having a thinner portion at each said end thereof, the adjacent arcuate elements being connected to each other with their end thinner portions overlapping one another; and plate-like reinforcing fitments mounted at each end of each said arcuate element from said thinner portion where said arcuate elements are connected to each other over an adjacent part of said thick portion on an axially outer side of each said arcuate element, wherein said core assembly is fitted in an annular fashion on an outer surface of a well portion of the rim to which the pneumatic tire is attached so that said core assembly may be slid on the well portion and rotated when the pneumatic tire has collapsed due to a reduction in internal pressure resulting in an inner surface of a crown portion of the pneumatic tire being placed into contact with a radially outer peripheral surface of said core assembly, and said arcuate elements are connected by tightening a bolt and nut assembly, said bolt passing through said plate-like reinforcing fitments over said connected thinner portions as well as through said connected thinner portions and retaining each said plate-like reinforcing fitment extending over said adjacent part of said thick portion against said thick portion using an attachment means, said core assembly having at least one flat portion on the radially outer peripheral surface of said core assembly so as to generate a vibration to notify a driver of a reduction in internal pressure of the pneumatic tire, a radial height of said core assembly being set in a range of 40% to 70% of an inflated height of the pneumatic tire, and a width of said outer peripheral surface of said core assembly being set at a value of 0.5 or more times said radial height.

2. A core assembly for use with a pneumatic tire according to claim 1, wherein the width of said outer peripheral surface of said core assembly is set at a value of 0.7 or more times said radial height.

3. A core assembly for use with a pneumatic tire according to claim 1, wherein the compressive modulus of said core assembly is set at 40 kg/cm$^2$ at a strain of 3%.

4. A pneumatic tire assembly comprising:
an annular rim;
a pneumatic tire body mounted on the rim; and
a core assembly which comprises two or more arcuate elements connected to one another with their ends placed one on another, each said arcuate element including a thick portion at a central portion and a thinner portion at each of said ends, adjacent arcuate elements being connected to each other by means of a bolt and nut assembly with their thinner portions placed one on another, said core assembly being fitted in an annular fashion on the outer side of a well portion of said rim, so that it may be slid on said well portion and rotated when said pneumatic tire body has collapsed due to a reduction in internal pressure resulting in an inner surface of a crown portion of said pneumatic tire body being placed into contact with a radially outer peripheral surface of said core assembly, at least a portion of said core assembly being formed from an elastomer material, a radial height of said core assembly during such contact being set in a range of 40% to 70% of the height of said pneumatic tire body when inflated, and a width of said outer peripheral surface of said core assembly being set at a value of 0.5 or more times said radial height, wherein where said arcuate elements are connected to each other using a plate-like reinforcing fitment mounted to extend over said thinner portion and an adjacent part of said thicker portion and be affixed thereto, wherein at least one of said two or more arcuate elements has a flat portion on a radially peripheral outer surface so as to generate a vibration to notify a driver of a reduction in internal pressure of the pneumatic tire, and a bolt of said bolt and nut assembly passes through said thinner portions of said adjacent arcuate elements and said plate-like reinforcing fitments overlying said thinner portion and adjacent thicker portion of each connected arcuate element to receive a nut of said bolt and nut assembly to connect said adjacent arcuate elements.

5. A pneumatic tire assembly according to claim 4, wherein the width of said outer peripheral surface of said core assembly is set at a value of 0.7 or more times said radial height.

6. A pneumatic tire assembly according to claim 5, wherein the compressive modulus of said core assembly is set at 40 kg/cm$^2$ or more at a strain of 3%.

7. A pneumatic tire assembly according to claim 4, wherein a portion of said plate-like reinforcing fitment overlying said thick portion is connected to said thick portion by a second shaft member.

* * * * *